Feb. 20, 1968     S. C. RETHORST     3,369,775
AIRCRAFT WING SYSTEM HAVING ZERO INDUCED DRAG
Filed Jan. 11, 1965     5 Sheets-Sheet 1

INVENTOR.

SCOTT C. RETHORST

Fig.9   UPPER JET SHEET OUTBOARD

\+

Fig.10   LOWER JET SHEET INBOARD

=

Fig.11   COMPENSATING TRAILING VORTICITY

Fig.12   WING TRAILING VORTICITY

*INVENTOR.*

SCOTT C. RETHORST

Fig.13 WING TRAILING VORTICITY

+

Fig.14 COMPENSATING TRAILING VORTICITY

=

Fig.15 ZERO VORTICITY IN WAKE

INVENTOR.
Scott C. Rethorst

Attorneys

United States Patent Office 3,369,775
Patented Feb. 20, 1968

3,369,775
AIRCRAFT WING SYSTEM HAVING
ZERO INDUCED DRAG
Scott C. Rethorst, 1661 Lombardy Road,
Pasadena, Calif. 91106
Continuation-in-part of application Ser. No. 424,169, Dec. 31, 1964, which is a continuation of application Ser. No. 358,792, Apr. 10, 1964. This application Jan. 11, 1965, Ser. No. 425,381
11 Claims. (Cl. 244—41)

This application is a further continuation-in-part of my application Ser. No. 358,792, filed Apr. 10, 1964, now abandoned and of my continuation-in-part application Ser. No. 424,169, filed Dec. 31, 1964, now abandoned. The invention pertains to improvements in aircraft and in particular relates to an improved aircraft wing or lifting system which is arranged to have a spanwise distribution of compensating counter vorticity equal in magnitude but opposite in rotational sense to the wing trailing vorticity, thereby leaving zero vorticity in the wake, and thereby producing zero induced drag.

Aircraft are normally sustained by a wing which is so shaped in cross section as to produce a circulation type of flow around the wing, which when added to a rectilinear velocity, produces a standing air wave, with the wing riding on the crest of this wave, changing the induced upflow to downflow at the wing, and thereby experiencing a lift force as a reaction to the force imposed on the air flow by the wing in changing its momentum from an upflow to a downflow. This circulation lift force may also be regarded as due to the centrifugal force of the air particles in flowing around a curved path both above the wing producing a suction on the upper surface and below the wing producing an increased pressure on the lower surface.

In the case of an infinite span wing, or a wing that extends between the walls of a wind tunnel, the flow is essentially uniplanar, and the flow about any one section is independent of the adjacent wing sections. In this case the flow is symmetrical longitudinally, as the upflow before the wing is symmetrically changed to a downflow aft of the wing, and the resulting lift force is normal to the undisturbed flow at infinity, thereby producing a lift with zero induced drag.

In the case of a finite span wing however, the high pressure developed below the wing and the reduced pressure developed above the wing lead to spanwise components of the flow, wherein the flow has an outboard component below the wing and inboard component above the wing, leading to a flow around the wing tips and a cross flow all along the span. The flow passing under the wing, having an outboard component, and the flow above the wing, having an inboard component, both trail off the wing with a resulting swirl, which continues downstream in the form of vortices. This shed vorticity along the span is a function of the spanwise lift distribution, and for the special case where the lift distribution is elliptical, the vorticity changes along the span in such a way that the downwash induced is uniform along the span, which leads to minimum induced drag for a conventional finite span wing.

This vorticity shed along the span results in a downwash in the flow between the wing tips, and an upwash in the flow outboard of the wing tips, superimposed on the forward upflow and aft downflow of the standing wave of the wing itself. The additional aft downwash between the wing tips thus superimposed on the normal standing wave results in an inclination of the total flow, such that the wing is immersed in a local flow which is inclined downward to the rear, and the lift force, which is normal to the local flow, is then inclined aft, and the aft component of this inclined force appears as induced drag.

The present invention provides an aircraft wing system having means to overcome this induced drag. The mechanism provided to accomplish this result is the provision of a spanwise distribution of compensating trailing vorticity equal in magnitude but opposite in sign to that produced by the wing lifting system. This compensating vorticity may be produced in any one of several ways, but a simple means to provide the desired result is the provision of a sheet of air, say either a jet from a power system, or a sheet of air taken on board the craft and exhausted through the trailing edge of the wing, in such a way as to contain the required compensating vorticity. This vorticity may be contained in a flow from a distribution of circular swirl orifices, or by a double jet sheet having crossed spanwise components, the upper sheet having an outboard component and the lower sheet an inboard component. If desired, the two sheets may be joined in a cone at the wing tips. In either case the required spanwise vorticity gradient would be provided by spanwise variation in side angle and mass flow.

The compensating trailing vorticity thus provided along the trailing edge of the wing, being equal in magnitude but opposite in sign to the wing trailing vorticity, has associated with it an induced flow field characteristic of a potential vortex, such that the velocity components induced throughout space are at every point equal in magnitude and opposite in direction to those induced by the wing trailing vorticity, with the net result that the velocity field of the wing trailing vortex system is completely cancelled. The adverse inclination of the flow is thus removed, as is the aft inclination of the force vector and its aft induced drag component.

Alternatively a spanwise distribution of vanes, ridges, grooves, fences, barriers, or edges may be provided on the surface of the wing itself, having an inboard component along the bottom surface of the wing and an outboard component along the upper surface of the wing. These ridges or grooves will guide the boundary layer and surface air in the direction of their orientation, thereby providing this boundary layer air with the desired spanwise component as it flows along the wing and aft off the trailing edge, with the upper and lower boundary layers then having an opposite orientation or direction so that when they flow off the trailing edge of the wing they will combine to provide the requiring sheet of compensating vorticity.

A further means of generating compensating vorticity is the provision of a jet flap with variable spanwise angle of downward inclination, such that on the underside the freestream flow slides inward with a spanwise flow component equal in magnitude and opposite in sign to the outboard spanwise component induced by the wing itself, so that the net flow direction under the wing has a zero spanwise component. A similar outward correction in the flow over the wing would also occur.

The vorticity thus generated by the freestream flow sliding off the spanwise inclined jet flap introduces a vortex sheet which is felt throughout the entire potential flow field, thus neutralizing the wing trailing vorticity.

The jet flap is thus inclined downward at greater angles approaching the wing tip where for example it might flare outward into a cone, thus providing a further pneumatic seal at the wing tip in the form of a jet sheet whose curvature due to the free stream flow provides a centrifugal force or pressure gradient to balance the uniform pressure drop on the upper surface of the wing at the tip. This enables the lift distribution on both the under and upper surface of the wing to be essentially uniform out of the wing tip, where it falls to zero through the jet flap sheet curvature.

The strength of the wing trailing vorticity will vary with the wing span loading and velocity of the aircraft. Hence this vorticity strength and distribution will vary not only from one aircraft to another, but on the same aircraft at different operating weights. A further independent variation will occur with velocity, providing a considerably different vorticity field say in climbing at a high lift coefficient at a lower velocity as compared to the conditions at cruise. Hence for maximum utility the compensating trailing vorticity provisions would be similarly variable in strength and spanwise distribution.

Such variable vorticity provisions would permit its use in *reverse* when desired to *add* to the wing trailing vorticity to *increase* induced drag, say to provide a steep approach on landing or to slow down for turns. In such a case the lift coefficient would be increased simultaneously by vertical inclination of the jet sheet as in a jet flap.

For a wing incorporating such compensating vortex provisions and having a normal spanwise lift distribution, say elliptical, thus having its maximum in the center and falling off to zero at the wing tips, the standing wave induced by the bound vortex representing the wing would have its maximum height in the center of the wing, falling off to the sides, decreasing in magnitude at the wing tips, but continuously diminishing outward beyond the sides of the wing. Thus the nature of the flow, as represented by the magnitude of the standing air wave, varies from one spanwise section to another, but there are no vertically unsymmetrical cross flow components along the wing span, although a symmetrical vortex free side flow upstream and downstream may occur. There is therefore no resultant energy dissipated in either sidewash or downwash, and the flow is symmetrical fore and aft. The local flow past the wing at any section is therefore not inclined downward as before, and the lift force produced is therefore normal to the flow velocity at infinity, and there is no induced drag component.

Induced drag loss can thus be avoided by the provision of compensating trailing vorticity in the wake of a loaded aircraft wing. Specifically the counteracting vorticity may be provided by vortex singularities in the emission of a fluid jet sheet having compensating vorticity, or by mechanical elements on the surface of the wing providing compensating spanwise flow components.

It is to be understood that the provision of compensating trailing vorticity in the wake is identical to and analogous with the elimination, reduction, or cancellation of the wing trailing vorticity, as the function of the compensating trailing vorticity is to eliminate, reduce, or cancel the effect of the wing trailing vorticity, so that the provision of compensating trailing vorticity is synonymous with a statement that a structure can be provided with geometry and flow provisions such as to reduce or avoid the shedding of wing trailing vorticity.

It is also to be understood that the generation of wing trailing vorticity requires the combination of an air flow over the upper surface and the lower surface of a wing, with these two flows having differing spanwise velocity components to produce the wing trailing vortex sheet. The compensating vorticity due to the provision of additional or modified compensating jet sheets is a combination of inducing flow components along the wing span both above and below the wing. It is to be understood that the strength of the upper and lower compensating flow sheets need not necessarily be the same, but may be adjusted as required to fit the requirements of individual geometry and flight conditions of the aircraft. Thus, one of the sheets may be stronger than the other, and the weaker of the two sheets may become very weak, and may vanish altogether, in which case there is only one jet sheet.

As said above, the compensating vortex sheet may be comprised of sheets of a fluid say of air or exhaust gas emitted from a separate system on board the aircraft, or they may consist of the boundary layer flows along the upper and lower surfaces of the wing itself, in which case the required spanwise velocity components of the flow could be provided by sideways deflection caused by a spanwise distribution of vanes, ridges, grooves fences, barriers, or edges on the external surface of the wing itself, having on the lower surface of the wing an inboard component proceeding aft and on the upper surface of the wing an outboard component proceeding aft. Here again it is to be understood that while such modifications or provisions may be made on both the upper and lower surfaces of the wing, the strength of the two provisions need not necessarily be the same, and one of the two flow modifications in fact could become so weak as to actually vanish, in which case there would only be one such modified flow sheet, provided either by an external fluid, or by the boundary layer along the remaining surface of the wing itself. In this case the single modified sheet would then combine with the unmodified flow along the other surface of the wing to provide a modified vortex sheet in the wake after the wing.

Thus, the possibility exists that the required conditions of zero vorticity in the wake may be induced by one modified sheet alone, either as an added fluid jet sheet or a modified boundary layer along one surface of the wing, where this sheet then combines with the unmodified outer flow along the other surface of the wing to provide the required conditions of zero net vorticity in the wake.

The foregoing and other readily apparent features of my present invention will be better understood by reference to the following more detailed specification and accompanying drawings, in which.

Figure 1:
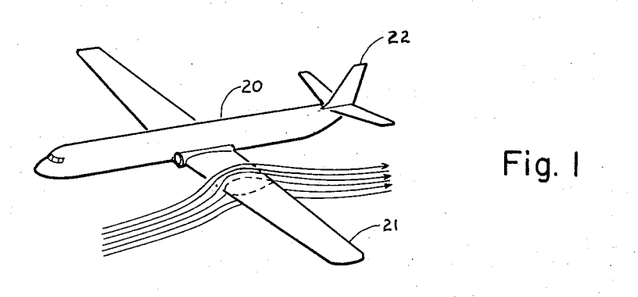
FIGURE 1 is a perspective view of the preferred embodiment of an aircraft wing system having zero induced drag employing the features of the present invention, and showing the aircraft translating upon a standing air wave.
Figure 5:
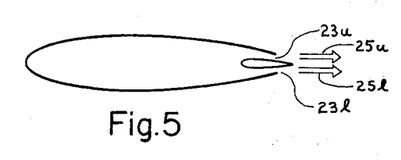
FIGURE 5 is a detail view of a typical section of the wing showing the upper and lower jet sheets emerging from the trailing edge of the wing, which because of their cross flow components together constitute a vortex sheet.
Figure 6:
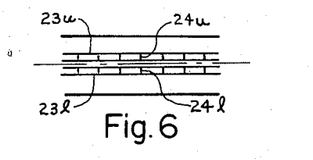
FIGURE 6 is an aft view of the structure of FIGURE 5 illustrating the upper and lower spanwise jet slots, including louvers to provide the spanwise flow components of the jet sheet.
Figure 7:
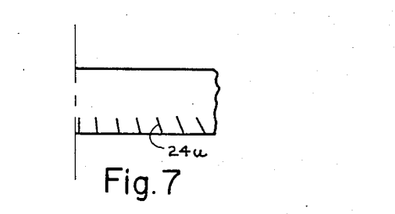
FIGURE 7 is a schematic plan view of an element of the trailing edge of the wing, illustrating the upper jet slot with its louvers disposed to produce an outboard flow component of the jet sheet.
Figure 8:
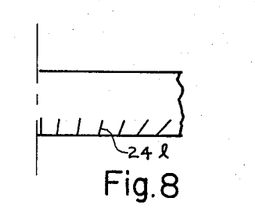
FIGURE 8 is a schematic plan view of an element of the trailing edge of the wing, illustrating the lower jet slot with its louvers disposed to produce an inboard flow component of the jet sheet.

In the drawings, like numerals refer to like or corresponding parts throughout the several views. Referring to FIGURE 1, there is illustrated an aircraft constructed in accordance with the present invention comprising a fuselage 20, a wing 21, and a tail structure 22. The wing 21 is provided along its trailing edge with a suitable spanwise slot 23, having an upper section 23u and a lower section 23l, as illustrated in FIGURE 5. The upper slot 23u contains louvers 24u which are inclined outboard as illustrated in FIGURE 7, whereas the lower slot 23l contains louvers 24l which are inclined inboard as illustrated in FIGURE 8. The aft view of the slot 23 in FIGURE 6 further illustrates its upper section 23u containing louvers 24u and its lower section 23l containing louvers 24l.

Figure 9:
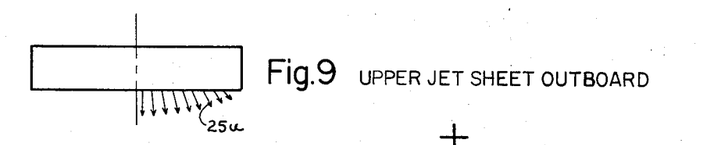
FIGURE 9 is a plan view of the wing showing the upper jet sheet having an outboard component which varies in intensity spanwise.
Figure 10:
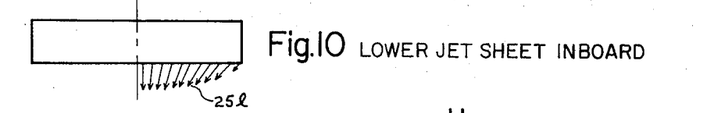
FIGURE 10 is a plan view of the wing showing the lower jet sheet having an inboard component also varying in intensity spanwise.

Suitable power means (not shown) cause a jet of fluid 25 (or air jet engine exhaust gas) to be emitted from said slot 23 in two jet sheets, the upper sheet 25u being omitted through the upper slot 23u and its louvers 24u with an outboard flow component varying along the span as shown in FIGURE 9, and the lower sheet 25l being emitted through the lower slot 23l and its louvers 24l with an inboard flow component similarly varying along the span as shown in FIGURE 10.

Figure 11:
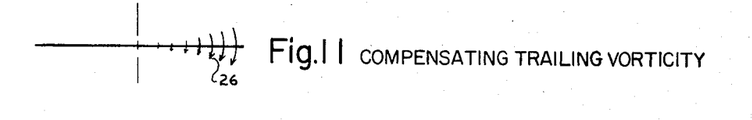
FIGURE 11 is an aft view of the superimposed jet sheets of FIGURES 9 and 10 constituting the spanwise compensating trailing vorticity distribution.

The upper jet sheet 25u of FIGURE 9 and lower jet sheet 25l of FIGURE 10 have crossed spanwise components, thereby providing a compensating swirl or vortex sheet 26 as shown in FIGURE 11. This vortex sheet 26 has associated with it a potential flow field having well-defined velocity components at any point in space.

Figure 12:
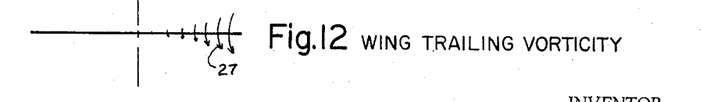
FIGURE 12 is an aft view of the spanwise distribution of wing trailing vorticity opposite in sense of rotation to the compensating trailing vorticity of FIGURE 11.

The finite span wing itself develops a spanwise flow, outboard below the wing and inboard above the wing, and these components of the flow past the wing produce a trailing vortex sheet 27 as illustrated in FIGURE 12, as is well known. This wing trailing vortex sheet 27 also has associated with it a potential flow field having similarly well defined velocity components at any point in space.

Figure 13:
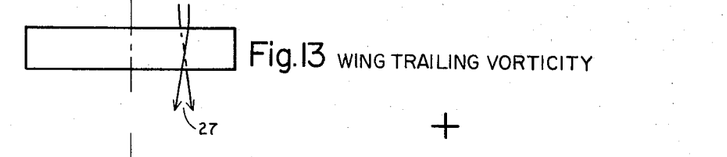
FIGURE 13 is a plan view of the wing illustrating the air flow past the wing having crossed spanwise components produced by the wing's lifting air pressure field and generating the wing trailing vorticity shown in FIGURE 12.
Figure 14:
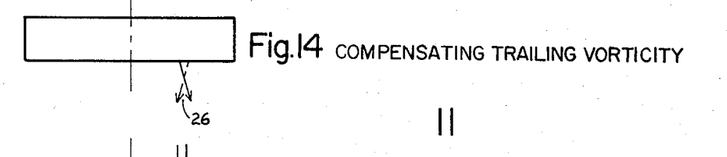
FIGURE 14 is a plan view of the wing illustrating the jet vortex sheet emitted from the trailing edge having crossed spanwise flow components, providing the compensating trailing vorticity illustrated in FIGURE 11.
Figure 15:
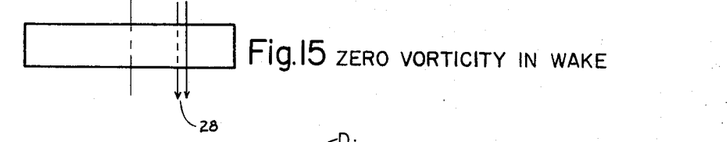
FIGURE 15 is a plan view of the wing illustrating air flow having zero net trailing vorticity.

This wing trailing vortex sheet 27 has associated with it a spanwise cross flow as illustrated in FIGURE 13. This vortex sheet results from the uncompensating spanwise flow shown in profile also in FIGURE 22. The compensating trailing vortex sheet 26 must then be provided in a strength and distribution such that its associated spanwise cross flow as illustrated in FIGURE 14 is equal in magnitude but opposite in sense of rotation to the wing trailing vorticity of FIGURE 13. The two trailing vortex systems are additive, and their associated potential flow fields will then produce velocity components which at every point in space will be of the same magnitude but opposite direction and so identically cancel. Thus the sidewash and downwash velocity components of the wing trailing vortex system will be compensated, resulting in a flow 28 which is symmetrical before and after the wing as illustrated in FIGURE 15.

Figure 16:
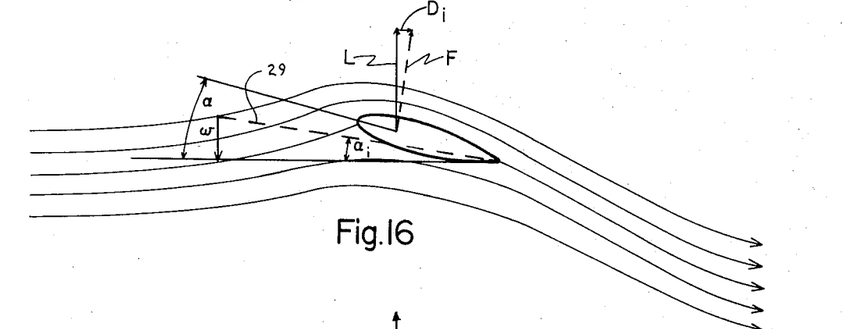
FIGURE 16 is a section view of a conventional three dimensional wing having no provisions for induced drag elimination, showing the inclined air flow, inclined force vector, and resulting induced drag.

A conventional finite span wing having no provisions for induced drag elimination will operate in an inclined flow field due to its trailing vortex system 27, developing a resultant force which is normal to the local inclined flow 29, and having an induced drag component $D_i$, as illustrated in FIGURE 16.

Figure 17:
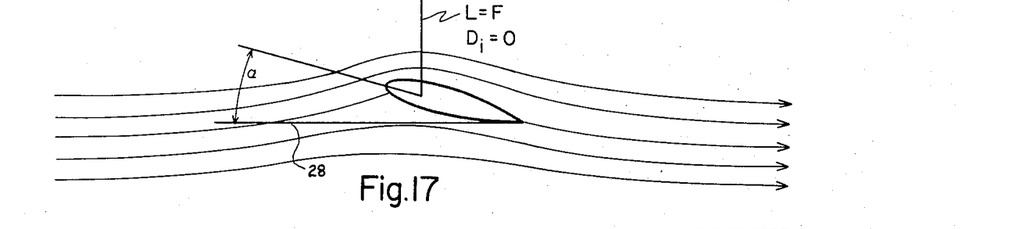
FIGURE 17 is a section view of the three dimensional wing system of this invention eliminating induced drag, showing the uninclined flow and resulting force normal thereto with zero induced drag component.

The improved lifting system of the present invention, however, with its provision of its compensating trailing vortex system 26, will operate in a flow field which is symmetrical before and after the wing, and thus uninclined. The resultant force will then be normal to the local uninclined flow 28, and be free of any induced drag, as illustrated in FIGURE 17.

Figure 2:
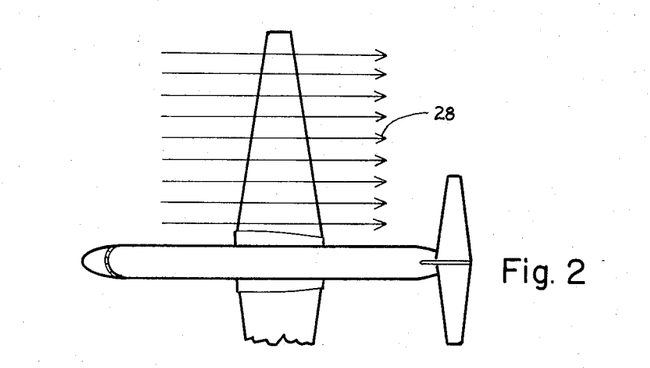
FIGURE 2 is a plan view of the aircraft of FIGURE 1 illustrating the air streamline pattern associated with the standing wave.
Figure 3:
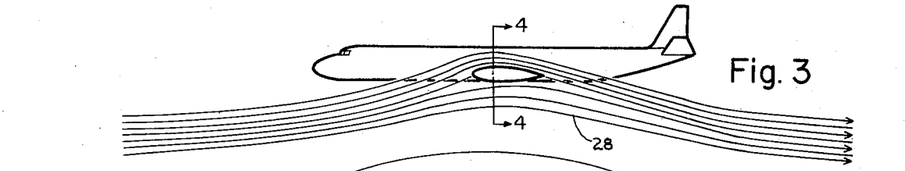
FIGURE 3 is a side view of the aircraft of FIGURE 1, illustrating the aircraft upon the crest of the self induced standing air wave.
Figure 4:
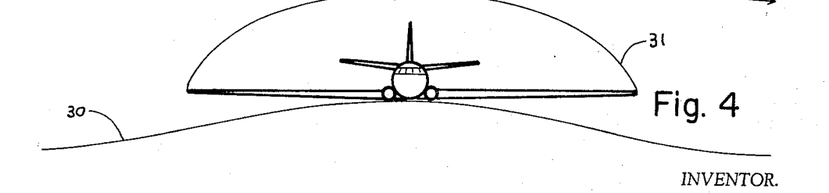
FIGURE 4 is a front view of the aircraft of FIGURE 1 illustrating the spanwise lift distribution upon the wing and the standing air wave obtained as a section 4—4 taken through FIGURE 3.

The flow field 28 then provides streamlines shown in the plan view of FIGURE 2. In FIGURE 3 the flow 28 is seen to provide a standing air wave, symmetrical fore and aft, with no downwash component. The standing wave 30, as illustrated in FIGURE 4, in case of elliptic lift distribution 31, is not uniform along the span, but is a maximum at the center of the wing, falling off symmetrically on both sides beyond the wing tips.

Figure 18:
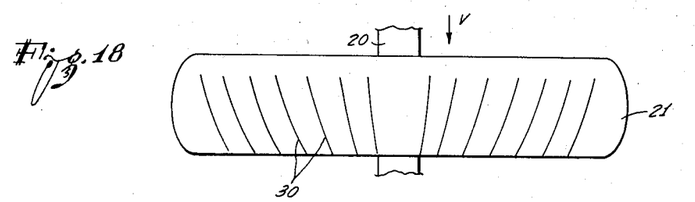
FIGURE 18 is a bottom view of an aircraft wing with fuselage and having ribs for providing an inboard compensating flow.
Figure 19:
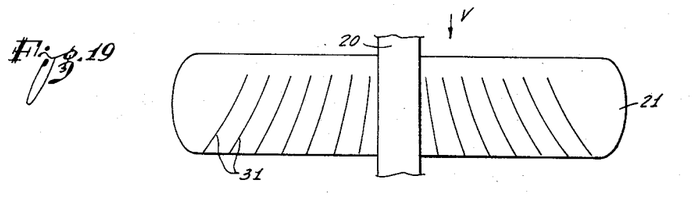
FIGURE 19 is a top view of the wing shown in FIGURE 18 with upper surface ribs providing outboard spanwise cross flow.
Figure 20:
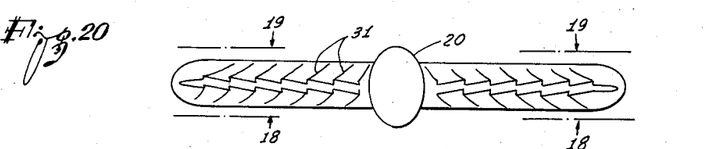
FIGURE 20 is a rear view somewhat schematically of the wing shown in FIGURES 18 and 19.

As illustrated in FIGURES 18 through 20, inboard flow components in the boundary layer and the wake can be introduced directly at the underside of the wing (seen in FIGURE 18) by providing ribs, ridges 30, grooves, fences, etc. which may be incorporated in a surface sheet of metal that forms the undersurface of the wing 21. Similar ridges 31 or the like can be provided on top of the wing but imparting upon the flow field an outboard component. The result will be a vortex free wake. The ribs or ridges need not extend to the leading edge of the wing 21, and will normally fair out at the trailing edge to conform to the usual sharp trailing edge for an aircraft wing.

As can be seen from the drawing, these ridges define curved flow channels, whereby at the underside the inboard component is the largest at the wing tip, and only little flow deflection is produced close to the fuselage 20. In an analogous manner, the outboard component of the flow as produced by curved channels defined by the ridges 31 on top of the wing will be largest at the wing tip while little flow deflection is produced near the fuselage 20.

The required conditions of zero vorticity in the wake could be provided by modifying the boundary layer flow on just one surface of the wing in such a way that it would combine with the unmodified boundary layer on the other surface of the wing to provide the condition of zero vorticity in the wake. Thus such grooves or fences could be provided on just one surface. Such grooves or fences will cause an adverse pressure gradient in the chordwise flow, and hence would preferably be installed on the lower surface of the wing, where such an adverse pressure gradient leading to a reduction in chordwise velocity would actually increase the circulation around the wing and hence the lift, as contrasted to the provision to an adverse pressure gradient on the upper surface of the wing, which would slow down the flow, detract from the circulation and decrease the lift. Thus, it is feasible to provide such fences or ridges disposed spanwise along the lower surface of the wing, inclined inboard proceeding aft along the chord of the wing, to thus provide an inboard component to the flow under the wing in the boundary layer say of the same extent as the inboard component provided by the lower pressure above the wing. The upper and lower boundary layer flows would then stream off the trailing edge of the wing with the same degree of inboard spanwise component, in which case there would be no vorticity delivered into the wake. A similar circulation and lift argument in the case of an added jet sheet of higher velocity would favor its location on the upper surface of the wing, inclined outboard. Or the combination of ridges below, inclined inboard, and a jet sheet above, inclined outboard could be used.

Thus, the upper surface of the wing can be provided with chordwise fences or ridges, disposed spanwise along the wing, inclined outboard proceeding aft to give an outboard component to the boundary layer along the upper surface of the wing, so as to match the outboard flow of the unmodified boundary layer along the under surface of the wing caused by the higher pressure below the wing, again producing the same outboard spanwise component of the two flows trailing off the wing, and again no vorticity in the wake.

On the other hand the riges or fence along the under surface of the wing can be given an inboard component such as to provide an inboard component to the boundary layer in excess of that caused by the lower pressure on the upper surface of the wing, so that a compensating vortex sheet would then stream off of the trailing edge of the wing having its rotation up inboard, to induce a further inboard component to the flow below the wing, thus helping to straighten out the general external flow field.

From a mathematical standpoint, it is interesting to note that the situation in general may be represented by a bound vortex along the quarter chord of the wing turning aft at the wing tips.

In accordance with Helmholtz law a vortex cannot end in a fluid, but must either close on itself or be reacted into a solid structure. In conventional wing theory the bound vortex is located in the structure in the first place, but in the present case instead of then continuing on out of the structure as in conventional aerodynamic theory into the trailing vortex pattern, the bound vortex continues into a closed loop in a horizontal plane within the wing structure itself, the trailing vortices being replaced by an aft part of the loop closing on itself along the trailing edge of the wing, representing the reaction in the wing structure.

Figure 21:
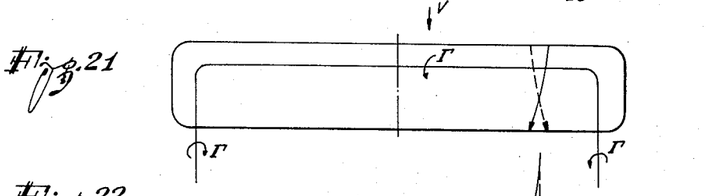
FIGURE 21 is a schematic representation of a conventional uncompensated wing showing the bound vortex trailing downstream at the wing tips.
Figures 22, 23:
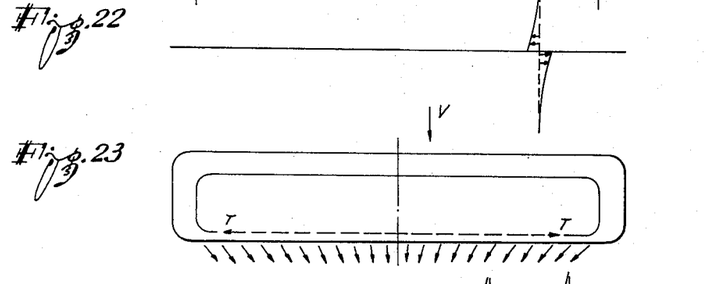
FIGURE 22 is a view from the rear of the trailing edge of the wing of FIGURE 21, showing the inboard drift above the wing and the outboard drift below the wing due to the pressure field above and below the wing respectively.
FIGURE 23 is a schematic representation of a wing with a single jet sheet emitted from the lower surface of the wing inclined inboard, with the reaction to this emission appearing as tension in the wing structure, which serves to close the bound vortex loop in lieu of the trailing vortex of FIGURE 21.

FIGURE 21 illustrates schematically such a bound vortex of strength gamma ($\Gamma$) as it extends in the wing structure, trailing off at the aft portion of the wing. The cross field producing such vorticity is shown as flow profile in FIGURE 22. On the other hand, when one uses means to compensate trailing vorticity in a manner outlined above, the vortex terminates in the wing structure by reacting with the wing. The inboard compensating flow along the underside of the wing surface produces tension T in the lower wing structure, while compensating outboard flow along the upper wing surface, if any, would produce compression in the upper wing structure with the two reactions then combining into a torque. Since the vortex terminates in the wing surface at two substantially symmetrical points in both wing portions, and since the reaction is transmitted through the wing structure, a closed loop is formed as illustrated in FIGURE 23.

A further explanation of the generation of compensating vorticity for the particular case of spanwise flow over the ridges on the wing surface may be provided in terms of the detailed flow mechanism over these ridges. Air flow over any such bluff edge will generate a vortex or eddy on either the windward or lee side of the ridge, or both. These vortices will then (1) provide a viscous mixing mechanism to transfer the kinetic energy of this spanwise flow into the boundary layer, essentially retaining its total head or energy level, minimizing its energy drain by maintaining its low-dissipation laminar form, (2) provide a sink to draw in the stagnant boundary sublayer along the chord so that the boundary layer cannot grow and dissipate higher energy in the turbulent form, (3) provide a conduit or disposal mechanism to transport this boundary sublayer aft to the trailing edge of the wing, and (4) provide a diffuser to convert its velocity energy into pressure.

The ridge height and spacing, and the corresponding vortex size, will then necessarily increase or grow towards the aft part of the wing partly to accommodate the increased mass flow of the sublayer air taken into the vortex, fairing out in the sharp trailing edge region to diffuse the velocity into pressure on the back side of the wing. Thus as the vortex increases in diameter, its angular velocity will decrease to conserve angular momentum, with this decrease in velocity resulting in an increase in pressure in accordance with conservation of energy or Bernoulli's equation, thus providing an angular diffuser. Hence the compensating vorticity appears as a reduction of the trailing vorticity, recovering its energy as pressure in the boundary layer.

The spanwise flows described will push the ridges in their flow direction, and thus the outward flow on the under side tend to stretch the lower structure, whereas the inward flow on the top side will tend to compress the upper structure. Thus generation of vortices in any asymmetric fashion along one or both sides of the ridges will provide a spanwise force on the wing in the form of a tension in the lower wing structure and a compression in the upper wing structure, which combine to form the torque as described above.

The reaction to the spanwise force on either surface of the wing will be a change in momentum of the spanwise flow, in accordance with Newton's Second Law, resulting in a change in magnitude of the spanwise flow, or a deflection of the resultant flow off the trailing edge of the wing. Such deflection of either the upper or lower flow, or both, can eliminate the differential in spanwise components, so that the two resultant flows will then come off the trailing edge with the same direction, thus shedding no trailing vorticity from the wing.

The ridges thus generate the compensating vorticity on the surface area of the wing, rather than at its trailing edge, thus providing the closed loop vortex pattern within the plan form of the wing as described. The trailing vorticity is generated in the sense of existence of its spanwise flow elements, but through recovery of its energy while in this element form as described, the trailing vorticity is never permitted to form as such and to be shed from the wing.

Figure 24:
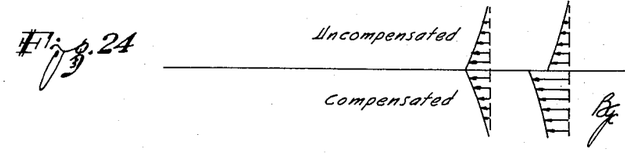
FIGURE 24 is a view from the rear of the trailing edge of the wing of FIGURE 23, showing the uncompensated inboard drift above the wing, and a compensated inboard component below the wing which may either equal or exceed the uncompensated flow above.

In FIGURE 24 is shown how a compensating flow field at the underside alone may suffice to cancel the wing trailing vorticity. Basically the compensating flow at the underside will be the mirror image of the uncompensated flow across the top surface. FIGURE 24 also illustrates that the compensating flow may exceed the flow above to produce further vorticity up inboard to further align the external flow if required.

Figure 25:
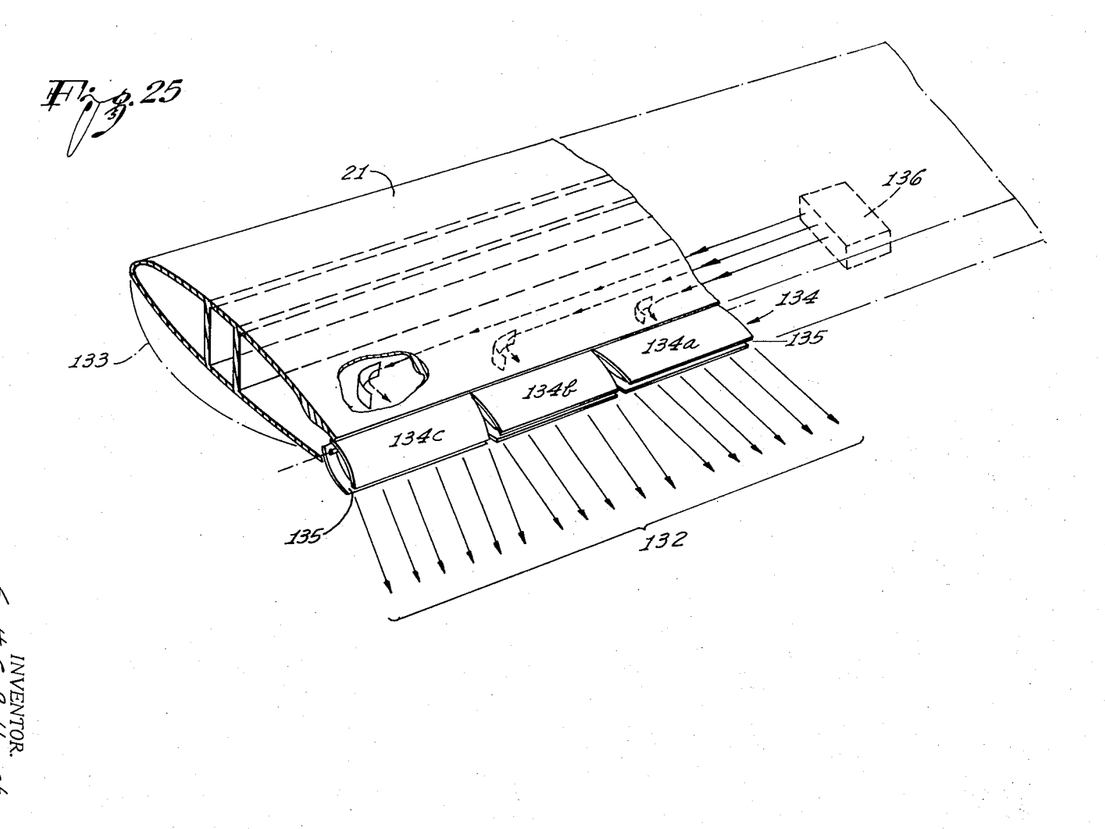
FIGURE 25 is a perspective view of a portion of a wing emitting at its trailing edge a jet flap having a downward deflection which increases from the center of the wing span to the wing tips.

The compensating spanwise flow may be provided by a jet flap 132 of variable angle of downward deflection as illustrated in FIGURE 25. This variable angle is accomplished by segmenting the jet flap emitting section 134 into a series of spanwise segments 134a, 134b and 134c. As shown in FIGURE 25, each of these segments 134a, 134b and 134c may be constructed to receive and discharge from its trailing edge 135 air under compression provided by a compressor 136 disposed as, for example, in the wing 21 or elsewhere in or on the aircraft. The increase in deflection of the jet flap towards the wing tips 133 accomplished by the means shown in FIGURE 25 causes the air flowing over the top of the wing to slide outboard, and the air flowing under the bottom of the wing to slide inboard. These two spanwise flow components again comprise a vortex sheet, inducing a compensating flow field again eliminating induced drag.

From another point of view, the increase in downward deflection of the jet flap outboard into a cone at the wing tips provides a further mechanism to spread the trailing vorticity in the y–z plane. Thus the propulsive jet system, and in particular the variable downward inclined jet flap, extends the vorticity over a further region, patricularly in the wing tips, providing a further mechanism to reduce induced drag.

It is clear from this disclosure and its accompanying set of figures that the means of controlling induced drag in the wake have been described in detail, and the magnitude of the provisions disclosed may be varied according to engineering considerations for different conditions as required.

While the preferred form and method of employing the invention have been described and illustrated, it is to be understood that the invention lends itself to numerous other embodiments without departing from its basic principles.

Having thus described my invention, what I claim as novel and desire to secure by Letters Patent of the United States is:

1. In combination, first means defining a first fluid contact surface of finite spanwise dimensions and over which a main fluid flows from a leading to a trailing edge, to trail off the trailing edge,
   second means defining a second fluid contact surface having the same leading and trailing edges as said first means and separating the fluid, so that a second main flow portion flows under the second means from the leading edge to trail off from the trailing edge, at least one of said first and second means being curved to produce lifting force for sustaining said first and second means in the fluid, there resulting a first flow component along said first means in a first spanwise oriented direction and second component along the second means in the respective opposite direction, and
   third means structurally combined with said first and second means for substantially eliminating said first and second flow components in both of the main flows along substantially the entire span aft of said fluid contact surfaces.

2. In combination, first means defining a first fluid contact surface of finite spanwise dimensions and over which a main fluid flows from a leading to a trailing edge, to trail off the trailing edge,
   second means defining a second fluid contact surface having the same leading and trailing edges as said first means and separating the fluid, so that a second main flow portion flows under the second means from the leading edge to trail off from the trailing edge, at least one of said first and second means being curved to produce lifting force for sustaining said first and second means in the fluid, there resulting a first flow component along said first means in a first spanwise oriented direction and second component along the second means in the respective opposite direction, resulting in a drag producing vorticity, and
   third means effective at the trailing edge of substantially eliminating said first and second flow components substantially along the entire trailing edge.

3. In combination, first means defining a first fluid contact surface of finite spanwise dimensions and over which a main fluid flows from a leading to a trailing edge, to trail off the trailing edge,
   second means defining a second fluid contact surface having the same leading and trailing edges as said first means and separating the fluid, so that a second main flow portion flows under the second means from the leading edge to trail off from the trailing edge, at least one of said first and second means being curved to produce lifting force for sustaining said first and second means in the fluid, there resulting a first flow component along said first means in an inward spanwise oriented direction and second component along the second means in the respective opposite direction, and
   third means for providing substantially uniformly aft oriented main flows aft of said trailing edge in the direction of the undisturbed free stream.

4. In combination, first means defining a first fluid contact surface of finite spanwise dimensions and over which a main fluid flows from a leading to a trailing edge, to trail off the trailing edge,
   second means defining a second fluid contact surface having the same leading and trailing edges as said first means and separating the fluid, so that a second main flow portion flows under the second means from the leading edge to trail off from the trailing edge, at least one of said first and second means being curved to produce lifting force for sustaining said first and second means in the fluid, there resulting a first flow component along said first means in an inward spanwise oriented direction and second component along the second means in the respective opposite direction, and
   third means for providing a compensating flow in spanwise inward direction and effective in the flow under said second means.

5. An aircraft wing for finite outward extension from a fuselage and having upper and lower surfaces and leading and trailing edges, the air trailing off the upper surface tending to have a spanwise inboard component, the air trailing off the lower surface tending to have a spanwise outboard component,
   air flow injecting elements for injecting into at least one of said trailing off air flows fluid having a spanwise oriented component opposite to the spanwise component such air tends to have when trailing off the respective wing surface.

6. An aircraft wing for finite outward extension from a fuselage, and having upper and lower surfaces, leading and trailing edges and a wing tip so that upon passage of the wing through air to develop lift, a drag producing air flow results flowing along inwardly from the tip along the upper surface and outwardly towards the tip along the lower surface, and
   air guide elements asymmetric in spanwise cross section on at least one of said surfaces inducing a flow component opposite to said drag producing air flow.

7. An aircraft wing for finite outward extension from a fuselage and having upper and lower surfaces, wing tip and leading and trailing edges, air flow directing elements at the trailing edge for producing a downwardly directed air flow component decreasing inwardly from the wing tip so that the air flow along the outward extension of said wing is substantially uniform in lateral direction at upper and lower surfaces, and
   means for supplying air to said elements.

8. An aircraft wing for finite outward extension from a fuselage and having upper and lower surfaces, a wing tip and leading and trailing edges, and a plurality of ridges asymmetric in spanwise cross section on said upper surface oriented to run substantially in the direction of the main flow to generate in conjunction with the spanwise flow over said ridges a series of vortices adjacent thereto within the plan form of said upper surface.

9. An aircraft wing for finite outward extension from a fuselage and having upper and lower surfaces, a wing tip and leading and trailing edges, and a plurality of ridges on said lower surface oriented to run substantially in the direction of the main flow to generate in conjunction with the spanwise flow over said ridges a series of vortices adjacent thereto within the plan form of said lower surface.

10. An aircraft wing for finite outward extension from a fuselage and having upper and lower surfaces, there being a plurality of ridges asymmetric in spanwise cross section on said upper surface oriented to run in the direction of the main flow and having additionally an outwardly oriented direction of extension, so that the flow in between neighboring ridges attains an outwardly directed component.

11. An aircraft wing for finite outward extension from a fuselage, and having upper and lower surfaces, there being a plurality of ridges on said lower surface oriented to run in the direction of the main flow and having additionally an inwardly oriented direction of extension so that the flow in between neighboring ridges attains an inwardly directed component.

References Cited

UNITED STATES PATENTS

| | | | |
|---|---|---|---|
| 2,477,461 | 7/1949 | Lee | 244—130 X |
| 2,479,487 | 8/1949 | Goembel | 244—42.41 |
| 2,740,596 | 4/1956 | Lee | 244—40 |
| 2,841,344 | 7/1958 | Stroukoff | 244—42 |
| 2,949,255 | 8/1960 | Glasby | 244—42 |
| 3,055,614 | 9/1962 | Thompson | 244—15 |
| 2,649,265 | 8/1953 | Grant | 244—91 |
| 1,303,544 | 5/1919 | Dorr | 244—41 |
| 3,090,584 | 5/1963 | Kuchemann | 244—42 |
| 3,262,659 | 7/1966 | Copeland | 244—42 |

FOREIGN PATENTS

| | | |
|---|---|---|
| 408,754 | 4/1910 | France. |
| 561,883 | 2/1923 | France. |
| 135,108 | 4/1952 | Sweden. |

OTHER REFERENCES

Foundation of Aerodynamics, second addition, by Kuethe and Schetzer, published by John Wiley & Sons, October 1964, pp. 251–254.

MILTON BUCHLER, *Primary Examiner.*

BENJAMIN A. BORCHELT, *Examiner.*

R. F. STAHL, B. BELKIN, *Assistant Examiners.*